United States Patent
Iyer et al.

(10) Patent No.: US 8,018,908 B2
(45) Date of Patent: Sep. 13, 2011

(54) MOBILE NETWORK BACKWARD COMPATIBILITY SUPPORT

(75) Inventors: Jayaraman Iyer, Sunnyvale, CA (US); David Lindert, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 766 days.

(21) Appl. No.: 11/504,864

(22) Filed: Aug. 16, 2006

(65) Prior Publication Data

US 2008/0043698 A1    Feb. 21, 2008

(51) Int. Cl.
    *H04W 4/00* (2009.01)
(52) U.S. Cl. ........ 370/338; 370/349; 370/328; 370/350; 370/469; 455/445; 455/406; 455/466; 455/436; 709/230
(58) Field of Classification Search .......... 370/349, 370/338, 328, 350, 331, 469, 352; 455/445, 455/426, 406, 466, 436; 709/230
See application file for complete search history.

(56) References Cited

U.S. PATENT DOCUMENTS

| | | | |
|---|---|---|---|
| 5,384,824 A | | 1/1995 | Alvesalo |
| 6,711,141 B1* | | 3/2004 | Rinne et al. ................ 370/328 |
| 6,954,441 B2 | | 10/2005 | Musikka |
| 7,016,360 B1 | | 3/2006 | Dong |
| 7,873,321 B2* | | 1/2011 | Fok et al. ................ 455/67.11 |
| 2001/0021175 A1* | 9/2001 | Haverinen | ................ 370/230 |
| 2002/0049059 A1* | 4/2002 | Soininen et al. | ............ 455/439 |
| 2002/0126631 A1* | 9/2002 | Lee | ................ 370/328 |
| 2003/0014367 A1* | 1/2003 | Tubinis | ................ 705/64 |
| 2003/0039237 A1* | 2/2003 | Forslow | ................ 370/352 |
| 2003/0142643 A1* | 7/2003 | Yang et al. | ................ 370/328 |
| 2003/0212822 A1* | 11/2003 | Saha et al. | ................ 709/245 |
| 2003/0225887 A1* | 12/2003 | Purnadi et al. | ............ 709/227 |
| 2004/0076178 A1* | 4/2004 | Botton | ................ 370/466 |
| 2004/0081086 A1* | 4/2004 | Hippelainen et al. | ........ 370/227 |
| 2004/0109455 A1* | 6/2004 | Jouppi et al. | ............ 370/395.52 |
| 2004/0166843 A1* | 8/2004 | Hahn | ................ 455/426.2 |
| 2004/0203765 A1* | 10/2004 | Das et al. | ................ 455/435.1 |
| 2005/0041584 A1* | 2/2005 | Lau et al. | ................ 370/235 |
| 2005/0106941 A1* | 5/2005 | Witchey | ................ 439/620 |
| 2005/0265363 A1* | 12/2005 | Chen | ................ 370/401 |
| 2006/0072573 A1* | 4/2006 | Broberg et al. | ............ 370/392 |
| 2006/0094421 A1* | 5/2006 | Munje et al. | ............ 455/427 |
| 2006/0203787 A1* | 9/2006 | Grech et al. | ................ 370/338 |
| 2010/0278122 A1* | 11/2010 | Singh et al. | ................ 370/329 |

* cited by examiner

*Primary Examiner* — Nick Corsaro
*Assistant Examiner* — Mahendra Patel
(74) *Attorney, Agent, or Firm* — Patent Capital Group

(57) ABSTRACT

In one embodiment, a method for supporting backward compatibility in a mobile network can include: receiving a packet in a first device that can support a first protocol; forming a modified packet by adding a field to the packet, where the field is related to a context for a second protocol; and providing the modified packet to a second device, where the second device can support the first and second protocols. The context can include a Packet Data Protocol (PDP) context and the field can include a PDP identifier. The mobility layer can include Mobile IP, for example. The first and second protocols can be Mobile IP and PDP, respectively.

20 Claims, 5 Drawing Sheets

MOBILE NETWORK BACKWARD COMPATIBILITY SUPPORT

BACKGROUND OF THE INVENTION

Embodiments of the present invention relate in general to mobile communications and, more specifically, to systems and methods for mobile network backward compatibility support. For mobile communication capability, Global System for Mobile Communications (GSM) and Universal Mobile Telecommunications System (UMTS) networks in particular have involved large investments in infrastructure (e.g., terminals and network nodes) in support of various protocols. Among the protocols or concepts with widespread usage is the Packet Data Protocol (PDP) (e.g., IPv4, IPv6, etc.) context in GPRS (General Packet Radio Service) Gateway Support Node (GGSN) systems.

However, as more traditional Radio Access Network (RAN) approaches continue to evolve in utilization of more standards-based protocols, aiming to increase inter-working across various networks and/or technologies, there may be convergence upon common equipment. One such protocol that is widely used for mobility applications is Mobile IP. However, systems supporting PDP contexts and those supporting Mobile IP may not be able to effectively inter-work.

DETAILED DESCRIPTION OF EMBODIMENTS OF THE INVENTION

Particular embodiments of the present invention can provide a system and method for supporting a logical layering of a Packet Data Protocol (PDP) context using Mobile IP, or another such mobility layer. Accordingly, an IP network evolution based on Mobile IP can maintain 3GPP (Third Generation Partnership Project) attributes by carrying PDP contexts over a mobility binding.

Advantages of particular embodiments include backward compatibility and roaming access across "3G" current networks (e.g. GPRS (General Packet Radio Service)) or other IP networks. Further, backward compatibility can be supported with existing logical infrastructure of PDP contexts. As such, movement toward a Mobile IP based cellular network can be maintained along with providing support for current "value-adds" offered in today's GPRS/UMTS (Universal Mobile Telecommunications System) networks.

Figure 1:
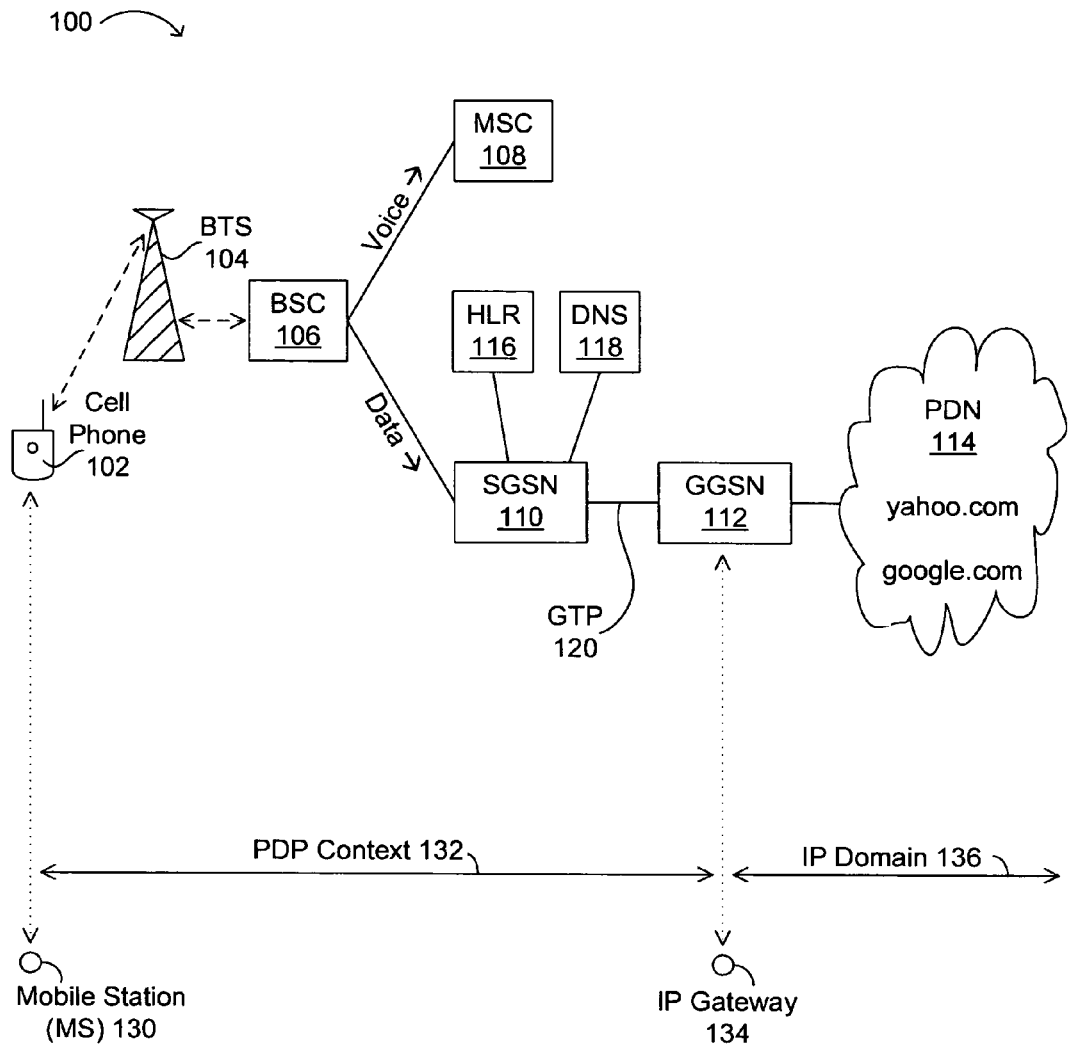
FIG. 1 depicts an example GPRS network.

Referring now to FIG. 1, an example GPRS network is shown and indicated by the general reference character 100. Such a network can employ UMTS 2.5 GHz and/or 3 GHz standards, for example. Cell phone 102 calls can be received/transmitted by Base Transceiver Station (BTS) 104, which can interface with Base Station Controller (BSC) 106. If a call from cell phone 102 is a voice call, it can be routed to Mobile Switching Center (MSC) 108. However, if the call is a data call, it can be routed to Serving GPRS Support Node (SGSN) 110. Gateway GPRS Support Node (GGSN) 112 can be a server and/or part of a switch/router, for example. Cell phone 102 can be any device (e.g., a laptop or another type of phone) that can access the Internet (e.g., Public Data Network (PDN) 114).

IP services that can be supplied to a mobile user of cell phone 102 can include services available via GGSN 112, such as Quality of Service (QoS), IP address allocation, security, policy, and billing/charging. Further, SGSN 110 can provide wireless service control for a user (e.g., a user of cell phone 102). Such service control can include a user profile via Home Location Registry (HLR) 116 and/or Domain Name Service (DNS) 118. Once a user connection is established, the user information can be retrieved from a database stored on HLR 116. For example, a determination of the types of service that a particular user is authorized to utilize can occur in this fashion. Further, other parameters can also be supplied, such as QoS profile, access mode, and/or Access Point Name (APN). An APN is essentially a logical name referring to a GGSN and an external network.

Cell phone 102 can have a user initially identified by IMSI (International Mobile Subscriber Identifier). With such information, SGSN 110 can retrieve the appropriate subscriber information for this user (e.g., an APN that the user is attempting to access from PDN 114). Such an APN may be provided via one server coupled to an actual web site (e.g., yahoo.com or google.com) that the user wishes to access. To facilitate this accessing, SGSN 110 can determine which of several possible GGSNs (e.g., GGSN 112) should be utilized for the connection. Each such GGSN may be able to support a subset of all APNs or other local settings and/or configurations of the APNs allocated to a particular GGSN, for example.

GPRS Tunneling Protocol (GTP) 120 can be used to set up a user connection between SGSN 110 and GGSN 112. Among the parameters in GTP 120 are Mobile Service IP (MSIP) address, QoS, access mode, and billing/charging characteristics, to name just a few. In one embodiment, this parameter information can be stored in GGSN 112. In operation, when SGSN 110 receives an activation or access request (e.g., initiated via cell phone 102), SGSN 110 can pass such associated GTP 120 to GGSN 112. The parameter information can be stored in GGSN 112 as part of a Packet Data Protocol (PDP), which can be a GTP session or context for each user.

A PDP context can be a logical association between a mobile station (e.g., MS 130) and a PDN (e.g., 114) running across a GPRS network, for example. Such a context can define aspects like routing, QoS, security, and/or billing, as just a few examples. In essence, a PDP context can be a signaling control block for support of a given user's data transport. A PDP context may be further defined as a user or application's session between a client and a host, where the host could form a connection to an operator's network, or simply a connection to a server in an operator's network or another network where one can access e-mail, other data, or streaming video, or the like. Or, a PDP context may be a peer-to-peer connection, such as may be used for a voice over IP (VoIP) call to another person. For example, the PDP context can define authorized or allowed attributes for each type of session. Further, a user or client can also have more than one PDP context in operation at one time. Also, more than one PDP context can share the same IP address. Once a PDP context is established, the user can send packets of data. Such packets can be provided from any suitable IP application (e.g., an e-mail program, a File Transfer Protocol (FTP) program, or a web program). The IP packets sent by the user can also be encapsulated into GTP 120.

Such a PDP context can be set up prior to a send/receive of data and may span from a user access device, such as cell phone 102, to GGSN 112. Further, the PDP context can include attributes, such as QoS and IP addresses, as discussed above. Going forward, Mobile IP may supplant such GPRS networks in whole or in part. A logical PDP context can be carried using a mobility layer (e.g., Mobile IP). In this particular example, PDP context 132 can be supported in a mobile IP session formed between mobile station (MS) 130 and IP gateway 134, for example. Such an approach can allow seamless user access into IP domain 136, regardless of the particular network and/or system employed.

Figure 2:
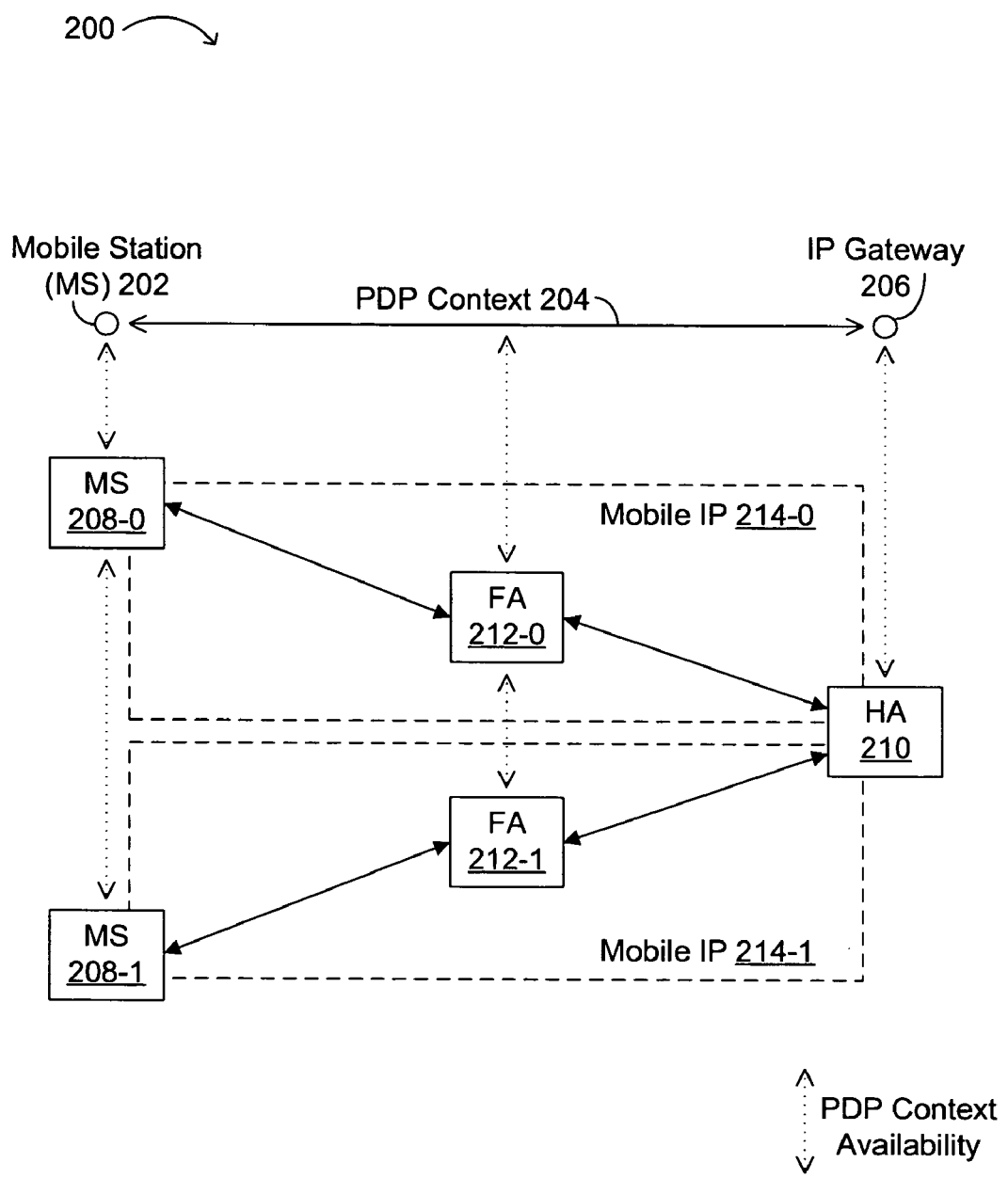
FIG. 2 depicts an example mapping between a logical PDP context and Mobile IP.

Referring now to FIG. 2, an example mapping between a logical PDP context and Mobile IP is shown and indicated by the general reference character 200. From mobile station 202 through IP gateway 206, PDP context 204 can be established. In a Mobile IP configuration, mobile stations (e.g., MS 208-0 and 208-1) can connect through foreign agents (e.g., FA 212-0 and 212-1) to a home agent (e.g., HA 210). Alternatively, one or both of FA 212-0 and 212-1 may be excluded from a particular system application. However, PDP context 204 may also be available at the foreign agent entity (e.g., FA 212-0 and 212-1), as shown. HA 210 can be a switch/router configured to provide anchoring services for a client, for example.

Mobile IP 214-0 can include a mobility session or binding between MS 208-0 and HA 210 via FA 212-0. Similarly, Mobile IP 214-1 can include a mobility session or binding between MS 208-1 and HA 210 via FA 212-1. In this particular example, associated packets can be sent over one of these mobility sessions, in a similar mapping to PDP context 204. Mobile IP can be applied to support backward compatibility to GSM (Global System for Mobile Communications), or other types of systems, as discussed above with reference to FIG. 1. In FIG. 2, PDP context 204 can be supported in Mobile IP by anchoring at MS 202 and IP gateway 206. This support can include implementing a logical layering of PDP context 204 using Mobile IP, for example.

In this fashion, migration to newer technologies, such as Mobile IP, can be accommodated to provide mobility routing, while maintaining backward compatibility for systems using PDP contexts. Further, because Mobile IP provides inter-technology mobility, home agents can provide services across WiFi or WiMAX (Worldwide Interoperability for Microwave Access), as well as GSM/UMTS systems. Thus, Mobile IP can be used to add mobility services to the basic IP structure, while maintaining the ability to work across different types of networks. For example, cellular operators who have their billing/charging and services through existing CDMA (Code Division Multiple Access) or GSM/UMTS systems can maintain that structure for Mobile IP systems. Accordingly, a PDP context may be virtually maintained as a logical connection within a UMTS network using Mobile IP, viewed from a perspective of an end-system client and/or a backend infrastructure.

Figure 3:
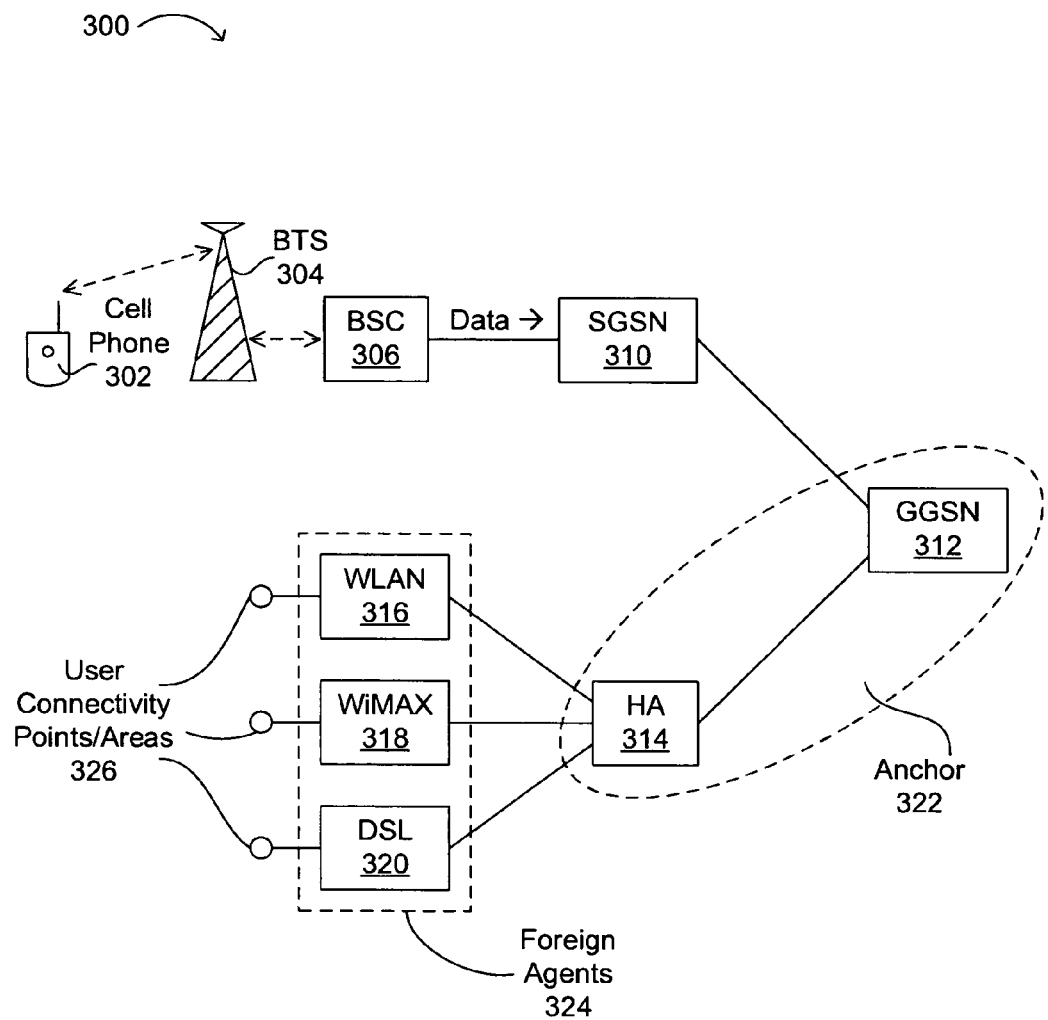
FIG. 3 depicts an example backward compatible Mobile IP to GPRS network system.

Referring now to FIG. 3, an example backward compatible Mobile IP to GPRS network system is shown and indicated by the general reference character 300. Cell phone 302 calls can be received/transmitted by BTS 304, which can interface with BSC 306. Data calls can be routed to SGSN 310 and onto GGSN 312, for example. A PDP context can be established between cell phone 302 and GGSN 312. A Mobile IP implementation can also carry this PDP context as a logical layering.

A mobility session or binding (e.g., using Mobile IP) can be established between user connectivity points/areas 326 and GGSN 312. Home agent (HA) 314 can connect to GGSN 312 and/or HA 314 and GGSN 312 can be combined to form anchor 322. In either approach, foreign agents 324 can support mobility sessions to HA 314 by providing any number of possible user connectivity options 326. For example, wireless local area network (WLAN) 316 can be a foreign agent providing a connection area. Similarly, WiMAX 318 can be another foreign agent providing a wider connection area network. Also, digital subscriber line (DSL) 320 can be another foreign agent having a hard-wired connection point and/or a wireless router attached thereto.

Because a PDP context can be maintained, cellular service providers can continue to manage billing, access, QoS, IP addresses, etc., in this format or protocol. A PDP context may establish a logical path between a mobile station (e.g., cell phone 302) and a GGSN (e.g., GGSN 312). Generally, a PDP context can allow applications to run on top of the session by way of IP applications, as well as other applications, and may use services of the accessed network, as can be defined by the attributes in the PDP context, such as QoS, for example. In addition, GGSN 312 can also be used for billing/charging in conformance with an operator's business model. On the other hand, Mobile IP is a mobility technology that allows clients to be mobile across fixed, mobile, or any type of networks (i.e., the access medium itself does not matter). Further, an anchoring capability, as discussed above, is provided within Mobile IP.

A logical PDP context can be carried (e.g., over a mobility binding) as part of Mobile IP. In one aspect of particular embodiments, a fixed/mobile conversion with a dual-mode enhancer can be used to convert between WiFi and GSM/UTMS systems. In another aspect, inter-working between multiple technologies can be improved, such as involving the evolution of existing (e.g., GSM/UTMS) networks using Mobile IP for mobility routing, while still carrying a logical PDP context, as viewed from the perspectives of a mobile station and operator. In another aspect of particular embodiments, roaming between CDMA and other networks can be supported. Also, a GGSN and a home agent can be combined (e.g., as anchor 322) in some embodiments.

Figure 4:
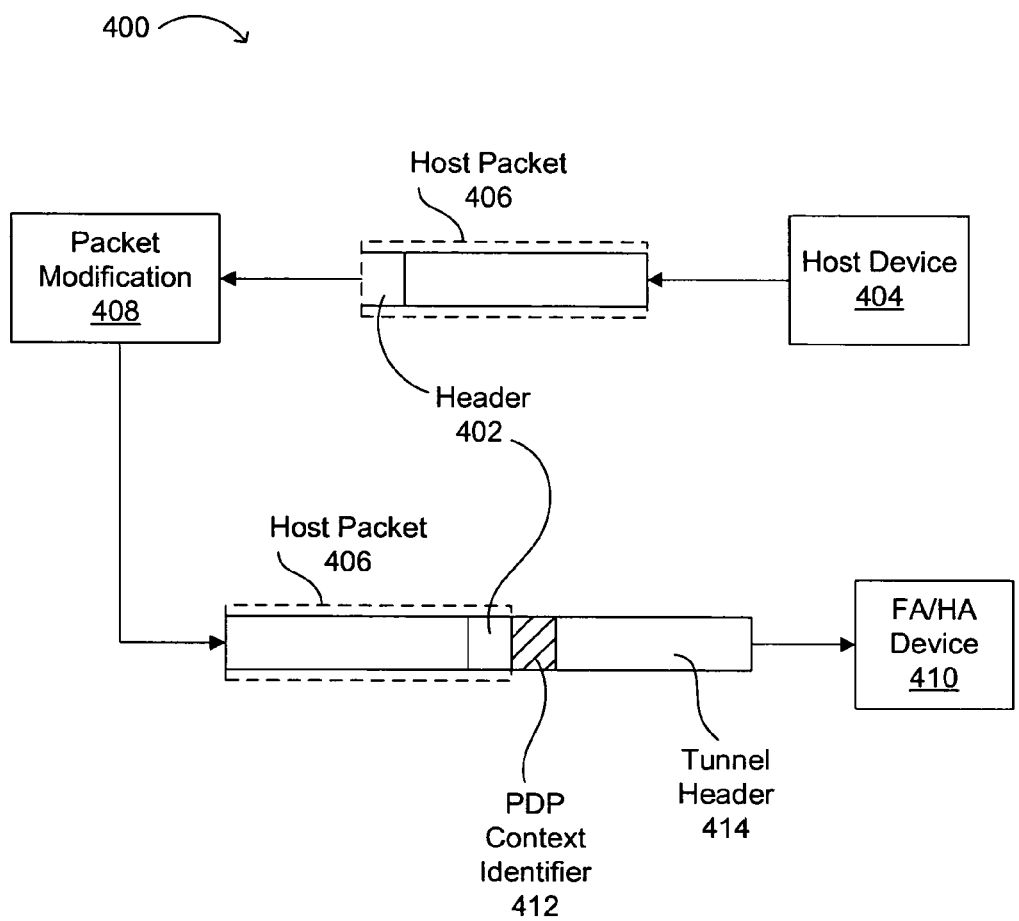
FIG. 4 depicts an example packet modification flow.

Referring now to FIG. 4, an example packet modification flow is shown and indicated by the general reference character 400. Host device 404 may be a generic host that can support MIP signaling and/or protocols. Host device 404 can supply host packet 406, containing header 402. Packet modification 408 can transform host packet 406 into a modified packet supporting a PDP context (e.g., by implementing a logical layering of the PDP context using Mobile IP).

Packet modification 408 can occur at a client and may include software loaded on a handset and/or a router (e.g., a home agent), for example. Such routers can be configured to be a foreign agent and/or a home agent, for example. Alternatively, or in addition to the loaded software, packet modification 408 can include logic configured to perform the modification. Optionally, the modified packet can be configured to be sent over a tunnel to a foreign agent and/or a home agent.

The modified packet can include the same header 402 and same payload components as host packet 406. However, PDP context identifier 412 can be appended to the host packet in forming the modified packet. Further, tunnel header 414 can also be appended thereto to facilitate the modified packet being sent to foreign agent and/or home agent (FA/HA) device 410.

Further, Mobile IP signaling can also be enhanced. For example, Mobile IP signaling messages RRQ (Request) and RRP (Response) can be enhanced with additional messages using existing Mobile IP mechanisms. For example, RRQ can be enhanced by an additional message from a mobile station to a home agent. Further, RRP can be enhanced by an additional message from a home agent to a mobile station. In Mobile IP, there may generally be three types of encountered nodes: home agent, mobile station, and, in some applications, also a foreign agent. The signaling modifications can establish a PDP context identifier and also associate the PDP context. Further, Mobile IP RRQ and RRP can be enhanced to carry this PDP context.

In this fashion, QoS, policy, security, and other attributes from a PDP context can be supported in Mobile IP applications. Further, such PDP context attributes can be adopted in moving between networks. In addition, Mobile IP attributes, such as enhanced security over security existing in WLAN, for example, may be applied. In general, adaptation when moving from one part of the network (e.g., a certain policy) or from one network to another can also be supported.

Figure 5:
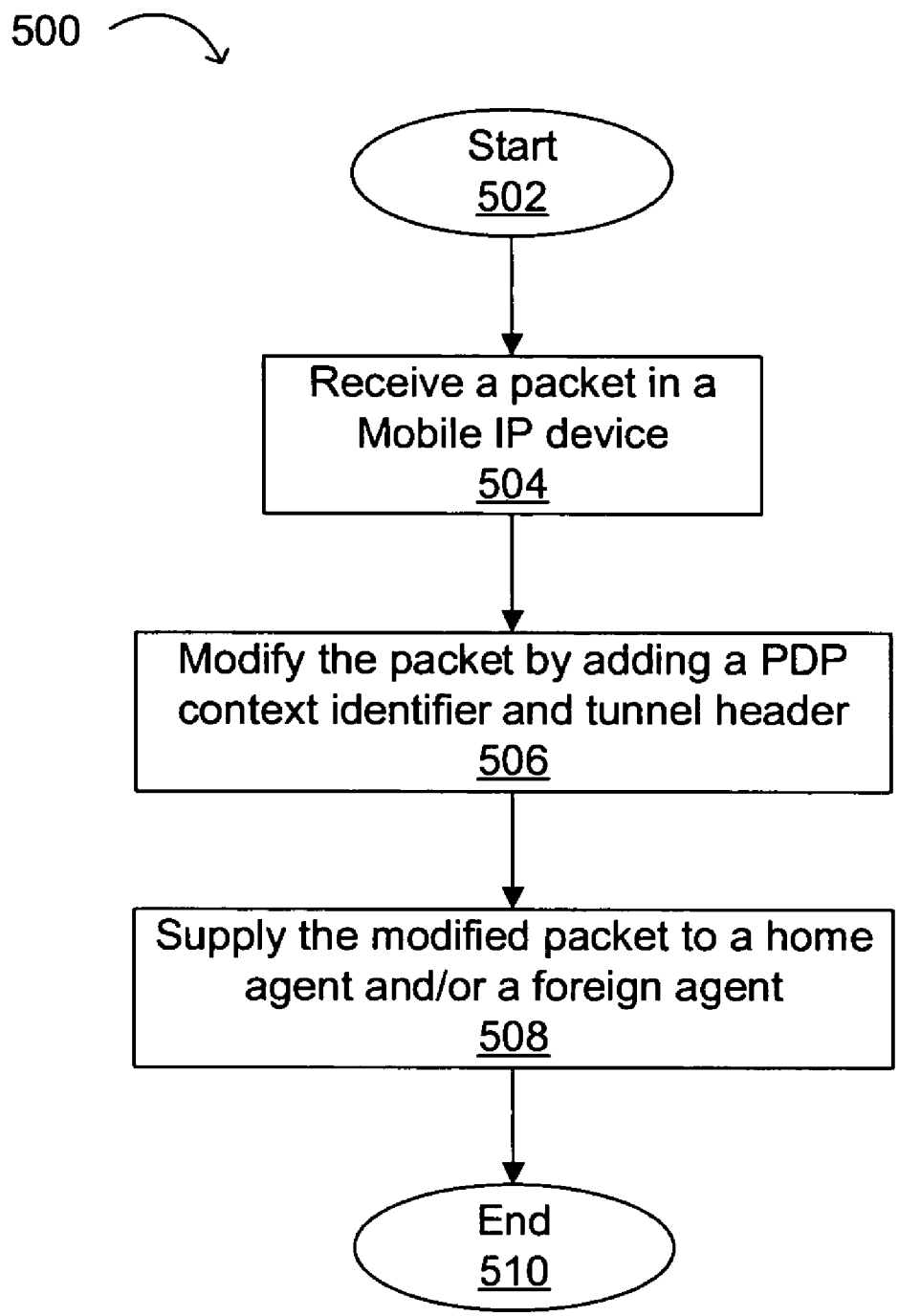
FIG. 5 depicts a simplified flow chart of a method of supporting Mobile IP backward compatibility.

Referring now to FIG. 5, a simplified flow chart of a method of supporting Mobile IP backward compatibility is shown and indicated by the general reference character 500. The flow can begin (502) and a packet can be received for transmission in a Mobile IP device (504). Such a Mobile IP device can be a generic host supporting Mobile IP signaling or protocols and/or the device can be a client associated with such a host, for example. This received packet can then be modified by adding a PDP context identifier and tunnel header (506).

The modification can be performed by software loaded onto a handset and/or a router (e.g., a home/foreign agent), for example. Alternatively, the modification can be performed by logic implemented on such a hardware device. The modified packet can be supplied to a home agent and/or a foreign agent (508) and the flow can complete (510). For example, when the modified packet is to be supplied to a home agent and/or a foreign agent, a tunnel header will also be added to the modified packet.

Mobile IP signaling can also be enhanced to carry the PDP context. Such enhancements can include RRQ being enhanced by an additional message from a mobile station to a home agent and/or RRP being enhanced by an additional message from a home agent to a mobile station.

Although GGSN and Mobile IP based protocols are primarily described herein, it will be understood that other types of networks and/or protocols may be appreciated by persons skilled in the art. For example, any type of protocol amenable to packet modification to support other protocols can be accommodated in accordance with particular embodiments. Further, land, mobile, or other general types of communication protocols can be employed in accordance with particular embodiments. For example, other variations of protocols, such as Point-to-Point Protocol (PPP) used in dial up connections and often combined with Layer 2 Tunneling Protocol (L2TP), can be utilized in accordance with particular embodiments. For example, PPP can define a session and may include parameters similar to what PDP does, although less complex. L2TP can provide a tunnel protocol that allows for extending a connection similar to GTP, but without any mobility. Using embodiments of the present invention adapted to support a PPP type session could be used to bring mobility to older wireless technologies that use a dial-up type solution and now allow the same services over more modern wireless technologies that use Mobile IP, for example.

Although the invention has been described with respect to specific embodiments thereof, these embodiments are merely illustrative, and not restrictive of the invention.

Any suitable programming language can be used to implement the routines of embodiments of the present invention including C, C++, Java, assembly language, etc. Different programming techniques can be employed such as procedural or object oriented. The routines can execute on a single processing device or multiple processors. Although the steps, operations, or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain and store the program for use by or in connection with the instruction execution system, apparatus, system or device. The computer-readable medium can be, by way of example only but not by limitation, a semiconductor system, apparatus, system, device, or computer memory.

Embodiments of the present invention can be implemented in the form of control logic in software or hardware or a combination of both. The control logic may be stored in an information storage medium, such as a computer-readable medium, as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

A "processor" or "process" includes any hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of embodiments of the present invention can be achieved by any means as is known in the art. Further, distributed, or networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as examples, and not as limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an" and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method, comprising:
receiving a packet from a first device that supports a mobility layer protocol, wherein a mobility binding is established between the first device and a second device in a mobile communications network using the mobility layer protocol and the packet includes a registration request (RRQ) message communicated to the second device;
generating a modified packet to support a packet data protocol (PDP) context by appending a PDP context identifier field to the received packet for identifying the PDP context, and also appending a tunnel header to the received packet, wherein the PDP context is provided for the registration request (RRQ) message communicated to the second device in order to use the PDP context to apply a security policy of the first device to the modified packet; and
providing the modified packet to the second device, wherein the second device supports both the mobility layer protocol and the PDP context such that the PDP context is maintained and carried over the mobility binding in the mobility layer protocol to provide backward compatibility with devices that use the PDP context.

2. The method of claim 1, further comprising enhancing a signaling in the mobility layer protocol to carry the PDP context by adding a message.

3. The method of claim 1, wherein the packet is related to signaling for the mobility layer protocol.

4. The method of claim 1, wherein the mobility layer protocol includes Mobile IP.

5. The method of claim 1, wherein the mobile communications network includes a GPRS (General Packet Radio Service) network.

6. The method of claim 1, wherein:
the first device comprises a cellular telephone; and
the mobile communications network manages one or more of billing, access, quality of service (QoS), and IP addresses, for the cellular telephone by using the PDP context.

7. The method of claim 1, wherein the second device comprises at least one of a home agent and a foreign agent.

8. An apparatus, comprising:
a processor; and
a computer-readable storage medium having instructions stored thereon, the instructions being executable by the processor to perform:
receiving a packet from a first device, the first device being in a mobility binding with a second device in a mobile communications network, the mobility binding being established using a mobility layer protocol, wherein the packet is configured for the mobility layer protocol and includes a registration request (RRQ) message communicated to the second device;
generating a modified packet to support a packet data protocol (PDP) context by appending a PDP context identifier field to the received packet for identifying the PDP context, and also appending a tunnel header to the received packet, wherein the PDP context is provided for the registration request (RRQ) message communicated to the second device in order to use the PDP context to apply a security policy of the first device to the modified packet; and
providing the modified packet to the second device, wherein the second device supports both the mobility layer protocol and the PDP context such that the PDP context is maintained and carried over the mobility binding in the mobility layer protocol to provide backward compatibility with devices that use the PDP context.

9. The apparatus of claim 8, wherein the packet is related to signaling for the mobility layer protocol.

10. The apparatus of claim 8, wherein the mobility layer protocol includes Mobile IP.

11. The apparatus of claim 8, further including a router, the router being configured for a GPRS (General Packet Radio Service) network.

12. The apparatus of claim 11, wherein the router is configured to operate as a GPRS Gateway Support Node (GGSN) server.

13. The apparatus of claim 8, wherein:
the first device comprises a cellular telephone; and
the mobile communications network manages one or more of billing, access, quality of service (QoS), and IP addresses, for the cellular telephone by using the PDP context.

14. A mobile communications network system, the system comprising:
a first device configured to provide a packet in a mobility layer protocol, the packet including a registration request (RRQ) message;
a second device configured to receive the packet and to output a modified packet to support a packet data protocol (PDP) context by appending a PDP context identifier field to the received packet for identifying the PDP context, and also appending a tunnel header to the received packet wherein the PDP context is provided for the registration request (RRQ) message communicated to the second device in order to use the PDP context to apply a security policy of the first device to the modified packet; and
a third device configured to receive the modified packet, the third device supporting both the mobility layer protocol and the PDP context such that the PDP context is maintained and carried over a mobility binding in the mobility layer protocol to provide backward compatibility with devices that use the PDP context, the mobility binding being established between the second and third devices using the mobility layer protocol.

15. The system of claim 14, further comprising a fourth device configured to enhance a signaling in the mobility layer protocol to carry the PDP context by adding a message.

16. The system of claim 14, wherein the packet is related to signaling for the mobility layer protocol.

17. The system of claim 14, wherein the mobility layer protocol includes Mobile IP.

18. The system of claim 14, further including a router, the router being configured for a GPRS (General Packet Radio Service) network.

19. The system of claim 18, wherein the router is configured to operate as a GPRS Gateway Support Node (GGSN) server.

20. The system of claim 14, wherein:
the second device comprises a cellular telephone; and
the system manages one or more of billing, access, quality of service (QoS), and IP addresses, for the cellular telephone by using the PDP context.

* * * * *